United States Patent
Moriwaki et al.

(10) Patent No.: US 8,926,161 B2
(45) Date of Patent: Jan. 6, 2015

(54) DISPLAY APPARATUS, MULTI-DISPLAY SYSTEM, AND METHOD FOR MANUFACTURING DISPLAY APPARATUS

(75) Inventors: Hiroyuki Moriwaki, Osaka (JP); Kenya Ito, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/115,651

(22) PCT Filed: May 7, 2012

(86) PCT No.: PCT/JP2012/002988
§ 371 (c)(1),
(2), (4) Date: Nov. 5, 2013

(87) PCT Pub. No.: WO2012/153510
PCT Pub. Date: Nov. 15, 2012

(65) Prior Publication Data
US 2014/0078778 A1    Mar. 20, 2014

(30) Foreign Application Priority Data
May 11, 2011 (JP) .................... 2011-106606

(51) Int. Cl.
| F21V 7/04 | (2006.01) |
| F21V 8/00 | (2006.01) |
| G09F 9/302 | (2006.01) |
| G09F 9/35 | (2006.01) |
| G02F 1/1333 | (2006.01) |
| G02F 1/1335 | (2006.01) |

(52) U.S. Cl.
CPC ............ *G02B 6/0001* (2013.01); *G09F 9/3026* (2013.01); *G09F 9/35* (2013.01); *G02F 1/13336* (2013.01); *G02F 1/133526* (2013.01)
USPC .......................................... 362/627; 362/628

(58) Field of Classification Search
USPC ......................................................... 362/627
See application file for complete search history.

(56) References Cited

U.S. PATENT DOCUMENTS

2007/0242478 A1* 10/2007 Arima et al. .................. 362/627

FOREIGN PATENT DOCUMENTS

JP        2010-072522 A    4/2010

OTHER PUBLICATIONS

Official Communication issued in International Patent Application No. PCT/JP2012/002988, mailed on Aug. 14, 2012.

* cited by examiner

*Primary Examiner* — Mary Ellen Bowman
(74) *Attorney, Agent, or Firm* — Keating & Bennett, LLP (57) ABSTRACT

A method for manufacturing a display apparatus includes a first step of arranging a display panel (110) inside a housing (130); a second step including a light guide lens formation step of forming a curved surface (151b) of a light guide lens (151) into a concave-convex surface having surface roughness of 40-250 μm, and a cover layer formation step of forming a light guide member (150) in such a manner that the curved surface (151b) of the light guide lens (151) is covered by a cover layer (152) to form an image-display-side surface of the cover layer (152) into a non-concave-convex surface; and a third step of bonding the light guide member (150) to a surface of an outer peripheral edge part of the display panel (110) and a surface of the window frame (130).

13 Claims, 7 Drawing Sheets

DISPLAY APPARATUS, MULTI-DISPLAY SYSTEM, AND METHOD FOR MANUFACTURING DISPLAY APPARATUS

TECHNICAL FIELD

The present disclosure relates to a display apparatus, a multi-display system using the display apparatus and configured to display a seamless image, and a method for manufacturing the display apparatus.

BACKGROUND ART

In recent years, for the purpose of use for, e.g., digital signage, emphasis has been placed on development of large-screen displays. In particular, increasing attention has been given to multi-display systems for each of which a large screen is formed in such a manner that a plurality of displays each including an extremely-narrow frame part are combined together.

In the case where a plurality of displays are combined together to form a large screen, a seamless image is preferably displayed such that a seam between adjacent ones of the displays is less noticeable. For such a reason, a frame-shaped light guide member such as a light guide lens is arranged at a peripheral edge part of each display so that a seam between adjacent ones of the displays can be less noticeable (see, e.g., Patent Document 1).

CITATION LIST

Patent Document

PATENT DOCUMENT 1: Japanese Unexamined Patent Publication No. 2010-072522

SUMMARY OF THE INVENTION

Technical Problem

In the case where the light guide lens is used as the light guide member, there is the following disadvantage. Light output through a concave-convex surface of the light guide lens is scattered at such an exit surface of the light guide lens, resulting in image blurring and darkening. As a result, visibility is lowered. For such a reason, light guided by the light guide lens is preferably output through a smooth surface (i.e., a non-concave-convex surface).

A method for polishing a light guide lens surface into a non-concave-convex surface is employed as a method for smoothing the light guide lens surface. Specifically, e.g., plural sheets of sandpaper with different degrees of surface roughness and a buff in which abrasive grains adhere to a cotton cloth or a hemp cloth are prepared. Then, the light guide lens surface is polished by using the sheets of sandpaper in the order from a lower grit number (e.g., about #80) to a higher grit number (e.g., about #2000). Subsequently, the light guide lens surface is further polished by using the buff. As a result, the light guide lens surface is formed into the non-concave-convex surface.

However, according to the foregoing method, it is necessary that the light guide lens surface is further polished with the buff after polishing with the sandpaper. Moreover, it is necessary that the light guide lens surface is, at the step of polishing the light guide lens surface with the sandpaper, polished by using the sheets of sandpapers in the order from a lower grit number of about #80 to a higher grit number of about #2000. Thus, the number of steps is extremely increased, and therefore there is a need to further improve productivity.

The present disclosure aims to form, in a display apparatus including a light guide member at a peripheral edge part of a display panel, a non-concave-convex surface through which light guided by the light guide member is output by simple manufacturing steps in order to realize excellent productivity.

Solution to the Problem

A display apparatus of the present disclosure includes a display panel; a housing containing the display panel and including an image-display-side part as a window frame corresponding to a peripheral edge part of the display panel, a displayed image on the display panel being viewed from an outside through a window surrounded by the window frame; and a light guide member which is provided so as to cover a surface of an outer peripheral edge part of the display panel and a surface of the window frame, and to guide light for image display to an outside of the display panel, and which includes a light guide lens having a flat surface facing the display panel and a concave-convex curved surface protruding toward an image display side and having surface roughness of 40-250 μm, and a cover layer covering the curved surface of the light guide lens and having a non-concave-convex surface on the image display side.

According to the foregoing configuration, since the cover layer covering the concave-convex curved surface of the light guide lens having surface roughness of 40-250 μm and having the non-concave-convex surface on the image display side is provided, light guided by the light guide member is output through the non-concave-convex surface. Thus, lowering of visibility caused by image blurring and darkening due to scattering of light output through the surface of the light guide member at such an exit surface thereof is reduced.

In the display apparatus of the present disclosure, the cover layer may be an adhesive film in which an adhesive layer provided close to the light guide lens and having a thickness greater than the surface roughness of the concave-convex curved surface and a base layer are stacked on each other.

In such a case, the adhesive film may further include an anti-reflection film on a surface of the base layer opposite to the adhesive layer.

An optical transparent double-sided tape or a gel sheet is preferable as a material of the adhesive layer.

According to the foregoing configuration, since the cover layer is the adhesive film in which the adhesive layer provided close to the light guide lens and having the thickness greater than the surface roughness of the concave-convex curved surface and the base layer are stacked on each other, the adhesive layer is provided such that recessed parts of the concave-convex curved surface are filled with the adhesive layer. Thus, a surface of the adhesive film which is the cover layer can be formed into the non-concave-convex surface.

In the display apparatus of the present disclosure, the cover layer may be a coating layer coating the concave-convex curved surface to form the non-concave-convex surface thereon and made of ultraviolet curable resin, thermoset resin, two-pack curable resin, or clear coat resin.

According to the foregoing configuration, since the coating layer made of the ultraviolet curable resin, the thermoset resin, the two-pack curable resin, or the clear coat resin coats, as the cover layer, the concave-convex curved surface to form the non-concave-convex surface thereon, the ultraviolet curable resin, the thermoset resin, the two-pack curable resin, or the clear coat resin is applied such that the recessed parts of the concave-convex curved surface are filled with such resin. Thus, a surface of the coating layer which is the cover layer can be formed into the non-concave-convex surface.

In the display apparatus of the present disclosure, the light guide member is provided at the peripheral edge part of the display panel, and light guided by the light guide member is output through the non-concave-convex surface. Thus, a multi-display system can be realized, in which, even if a plurality of display apparatuses are combined and each display apparatus displays a corresponding one of enlarged portions of a signal image, a seam between adjacent ones of the display apparatuses is less noticeable.

A method for manufacturing a display apparatus includes a first step of arranging a display panel inside a housing such that a displayed image on the display panel is viewed from an outside through a window surrounded by a window frame of the housing corresponding to a peripheral edge part of the display panel; a second step including a light guide lens formation step of forming a light guide lens having a flat surface facing the display panel, and a concave-convex curved surface protruding toward an image display side and having surface roughness of 40-250 µm, and a cover layer formation step of forming a light guide member in such a manner that the curved surface of the light guide lens is covered by a cover layer to form an image-display-side surface of the cover layer into a non-concave-convex surface; and a third step of bonding, to a surface of an outer peripheral edge part of the display panel and a surface of the window frame, the light guide member configured to guide light for image display to an outside of the display panel. After the first and second steps are performed independently of each other, the third step is performed. Alternatively, after the light guide lens formed at the light guide lens formation step is bonded to the surface of the outer peripheral edge part of the display panel and the surface of the window frame, the cover layer formation step is completed to complete the third step.

According to the foregoing method, since it is only necessary to form, at the light guide lens formation step, the curved surface of the light guide lens into the concave-convex surface having surface roughness of 40-250 µm, polishing is not necessarily performed until the surface roughness reaches 40 µm or less, and therefore the polishing step can be simplified. Moreover, since the cover layer having the non-concave-convex surface on the image display side is, at the cover layer formation step, provided so as to cover the concave-convex curved surface of the light guide lens having surface roughness of 40-250 µm, the exit surface of light guided by the light guide member can be formed into the non-concave-convex surface without performing, e.g., a polishing step using a buff.

In the method of the present disclosure, at the light guide lens formation step, the concave-convex curved surface of the light guide lens may be polished with an abrasive.

In the method of the present disclosure, at the cover layer formation step, an adhesive film in which an adhesive layer having a thickness greater than the surface roughness of the concave-convex curved surface and a base layer are stacked on each other may be, as the cover layer, bonded to the light guide lens such that the adhesive layer contacts the light guide lens.

In such a case, the adhesive film may further include an anti-reflection film on a surface of the base layer opposite to the adhesive layer.

An optical transparent double-sided tape or a gel sheet is preferable as a material of the adhesive layer.

In the method of the present disclosure, at the cover layer formation step, a coating layer may be, as the cover layer, formed in such a manner that the concave-convex curved surface is coated by ultraviolet curable resin, thermoset resin, two-pack curable resin, or clear coat resin to form the concave-convex curved surface into the non-concave-convex surface.

A surface of the display panel on the image display side may be covered by a front cover part integrally formed with the light guide member, and a surface of the light guide member on the image display side and a surface of the front cover part on the image display side may be connected together through a smooth curved surface.

According to the foregoing configuration, the front cover part integrally formed with the light guide member is provided, and the surface of the light guide member on the image display side and the surface of the front cover part on the image display side are connected together through the smooth curved surface. Thus, there is no boundary between light output through the surface of the light guide member on the image display side and light output through part of the surface of the front cover part inside the light guide member. Consequently, an image more natural to a viewer is displayed.

Advantages of the Invention

According to the present disclosure, since it is only necessary to form, at the light guide lens formation step of the display apparatus manufacturing method, the curved surface of the light guide lens into the concave-convex surface having surface roughness of 40-250 µm, polishing is not necessarily performed until the surface roughness reaches 40 µm or less, and therefore the polishing step can be simplified. Moreover, since the concave-convex curved surface of the light guide lens having surface roughness of 40-250 µm is covered by the cover layer and is formed into the non-concave-convex surface on the image display side, the exit surface of light guided by the light guide member can be formed into the non-concave-convex surface without performing, e.g., the polishing step using the buff.

Thus, the surface through which light guided by the light guide member is output can be formed into the non-concave-convex surface by simple manufacturing steps, resulting in excellent productivity.

DESCRIPTION OF EMBODIMENTS

Example embodiments of the present disclosure will be described below. Note that the present disclosure is not limited to the embodiments described below. Moreover, the same reference numerals are used to represent identical or equivalent elements in drawings.

First Embodiment (Multi-Display System)

Figure 1:
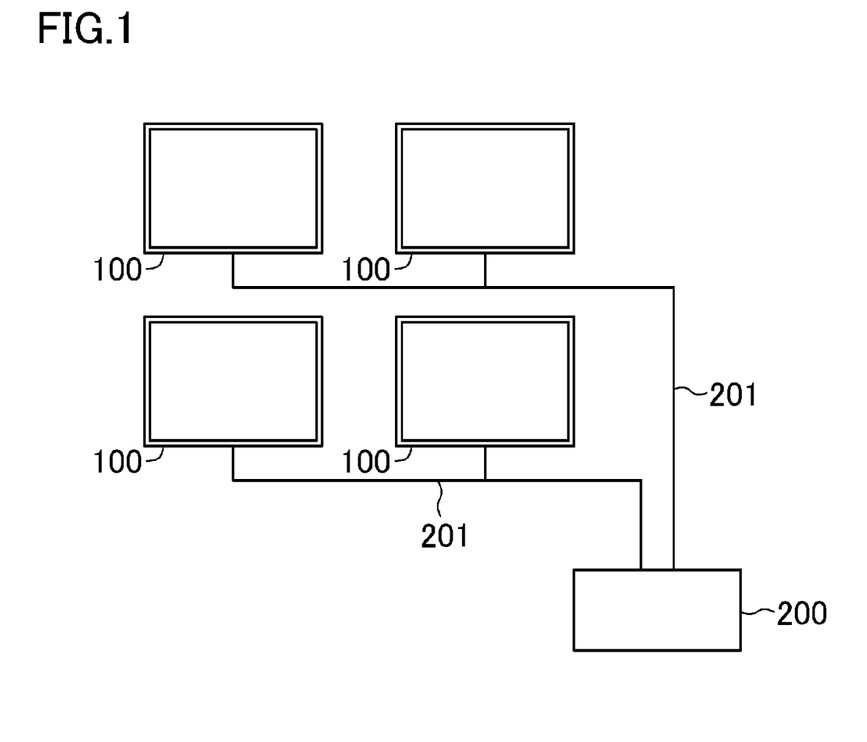
FIG. 1 is a schematic diagram of an entire configuration of a multi-display system.

FIG. 1 is a schematic diagram of a multi-display system 10. The multi-display system 10 is used for, e.g., digital signage configured to display an image on a large screen.

The multi-display system 10 includes a plurality of display apparatuses 100 (four display apparatuses 100 in FIG. 1) and a manager 200. The manager 200 communicates with each display apparatus 100 via a network 201. The manager 200 has functions to transmit contents to be displayed at each display apparatus 100 and to switch a display mode of each display apparatus 100. Note that the display apparatuses 100 may be connected together in parallel to each other as illustrated in FIG. 1, or may be connected together in series with each other via a general purpose interface bus (GPIB) interface board.

Figure 2:
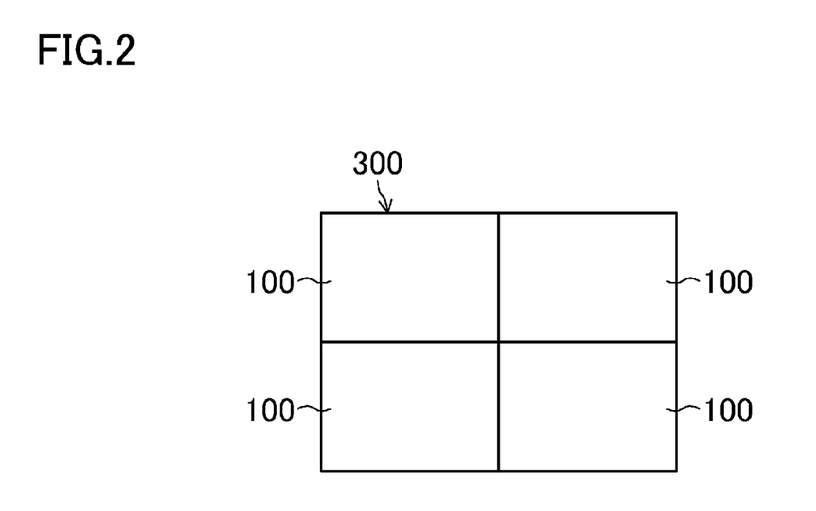
FIG. 2 is a view illustrating the state in which displays of the multi-display system are assembled together.

FIG. 2 illustrates the state in which the display apparatuses 100 are assembled together. The display apparatuses 100 forms a large-screen display 300. Each display apparatus 100 may display, based on a command from the manager 200, a corresponding one of enlarged portions of a single image so that the single image can be displayed across the large-screen display 300. Alternatively, the same image may be displayed on the display apparatuses 100 without image enlargement (i.e., four images are displayed in a matrix). As still another alternative, different images may be displayed on the display apparatuses 100.

(Display Apparatus)

Figure 3:
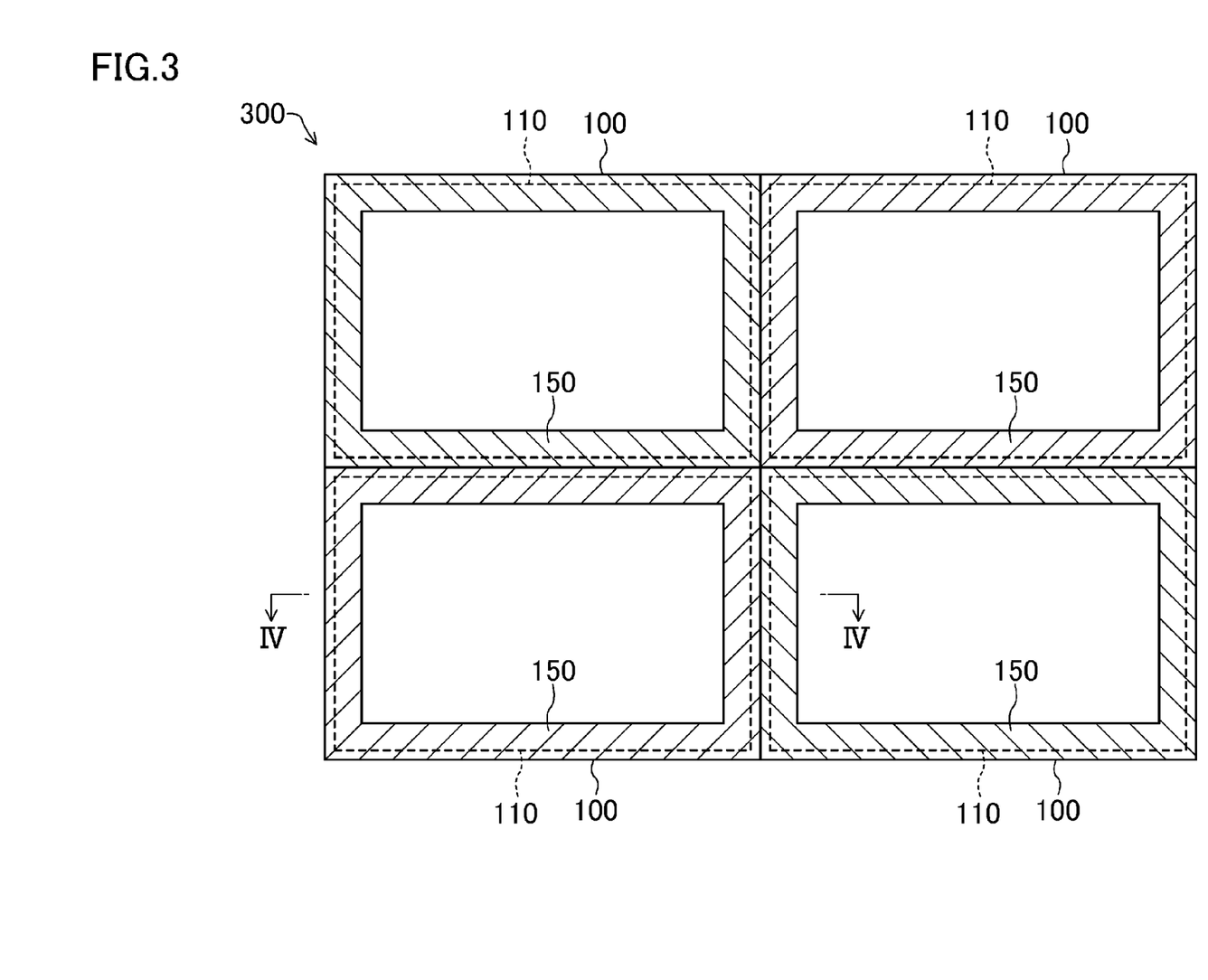
FIG. 3 is a schematic plan view of a large-screen display.
Figure 4:
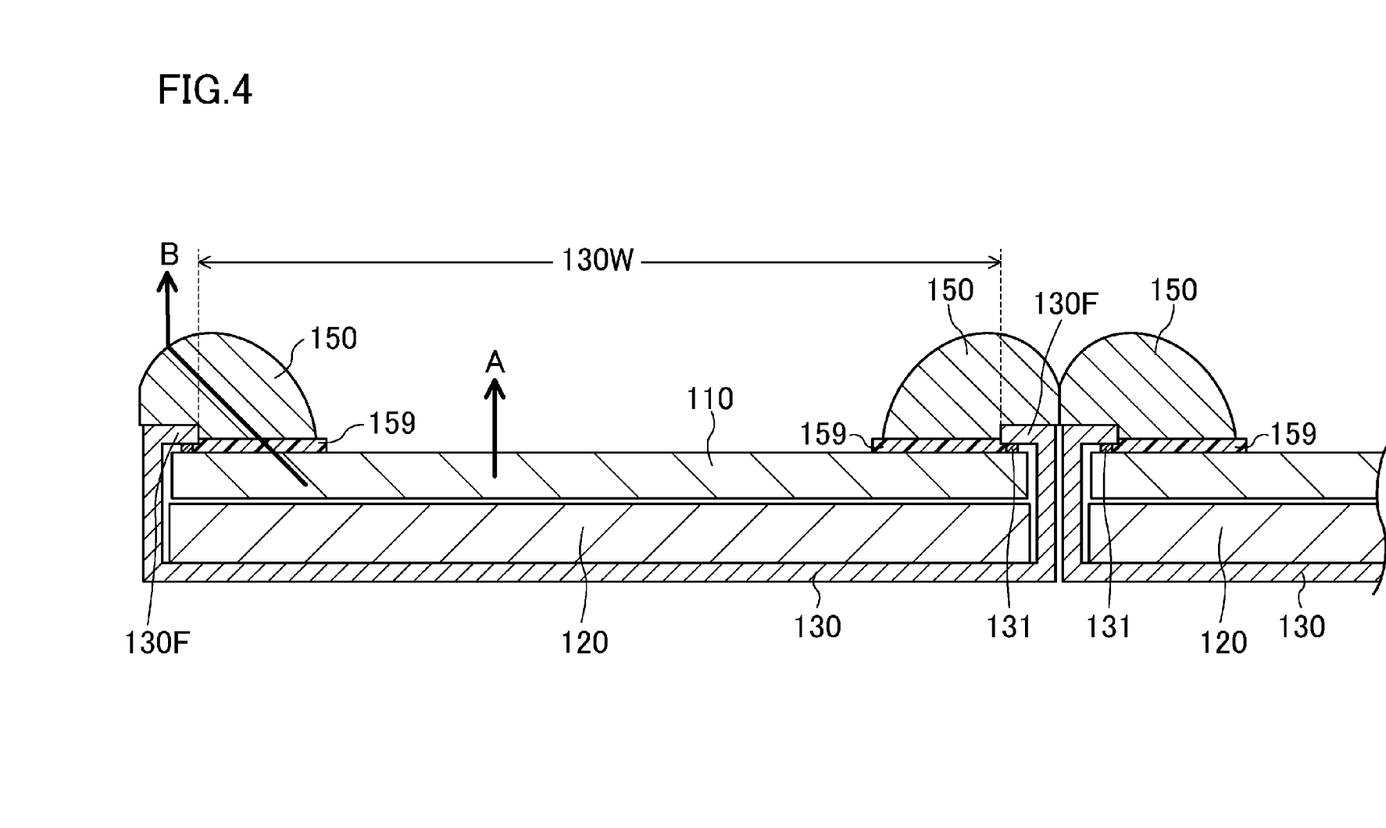
FIG. 4 is a cross-sectional view along an IV-IV line of FIG. 3.
Figure 5:
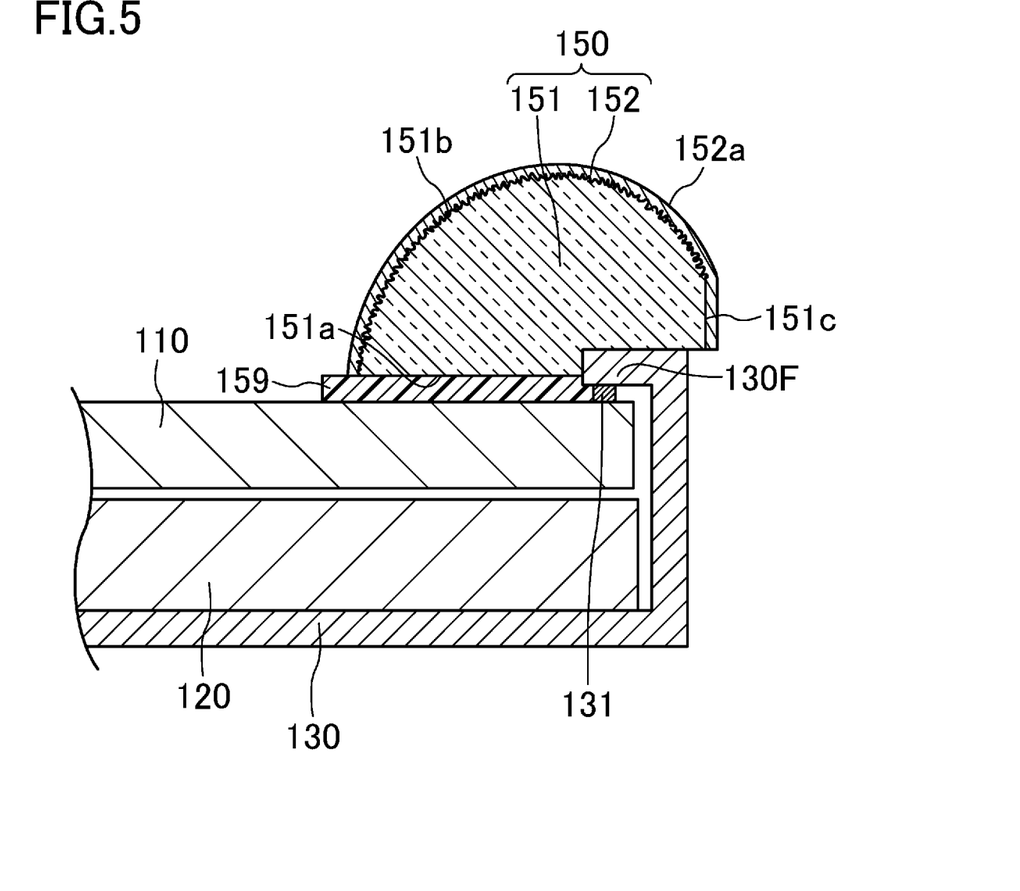
FIG. 5 is an enlarged cross-sectional view of a main part of a display apparatus of a first embodiment.

FIG. 3 is a schematic plan view of the large-screen display 300 of the multi-display system 10, and FIG. 4 is a partial cross-sectional view of the large-screen display 300. Moreover, FIG. 5 is an enlarged cross-sectional view illustrating the vicinity of a light guide member in the display apparatus 100.

Although not shown in the figure, a display panel 110 is configured such that two substrates are arranged so as to face each other, and that a sealing material is provided in a frame shape between the substrates at a peripheral edge part of the display panel 110. A liquid crystal layer is provided between the substrates in a region surrounded by the sealing material, thereby forming a liquid crystal display panel. Polarizing plates are provided respectively on surfaces of the substrates opposite to the liquid crystal layer. The display panel 110 is, e.g., a display having about a 60-inch size, i.e., a vertical length of 747 mm and a horizontal length of 1328 mm.

A backlight unit 120 is arranged so as to face a surface of the display panel 110 opposite to an image display side thereof. Although not shown in the figure, the backlight unit 120 includes, e.g., a light source such as a cold cathode fluorescent tube or a light emitting diode (LED), a light guide plate configured to guide light from the light source to the display panel 110, and a diffuser plate. When passing through the liquid crystal layer, the transmittance of light guided by the light guide plate and entering the display panel 110 is adjusted according to an alignment direction of liquid crystal molecules. Then, the light is output from the substrate on the image display side, thereby displaying an image.

Although not shown in the figure, a housing 130 includes, e.g., a front housing part containing the display panel 110, and a back housing part supporting the backlight unit 120. A surface of the housing 130 forms, as viewed from the image display side, a window frame 130F corresponding to the peripheral edge part of the display panel 110, and part of the housing 130 surrounded by the window frame 130F forms a window 130W. The display panel 110 is positioned inside the housing 130 such that a displayed image can be viewed from the outside through the window 130W. A frame-shaped spacer 131 is formed along the peripheral edge part of the display panel 110 on a surface of the display panel 110 on the image display side, and the display panel 110 and the housing 130 are fixed together at inner surfaces thereof by the spacer 131.

A frame-shaped light guide member 150 is provided at the peripheral edge part of the display panel 110 on the surface of the display panel 110 on the image display side. The light guide member 150 includes a light guide lens 151 and an adhesive film 152 which is a cover layer provided so as to cover a surface of the light guide lens 151 on the image display side.

The light guide lens 151 includes a first flat surface 151a facing the display panel 110, a curved surface 151b protruding toward the image display side, and a second flat surface 151c forming an outer surface of the light guide member 150. The light guide lens 151 is in a plano-convex lens shape. The curved surface 151b of the light guide lens 151 is a concave-convex curved surface having surface roughness of 40-250 μm. In order to illustrate the concave-convex curved surface 151b, concavity and convexity are emphasized in FIG. 5. The light guide lens 151 is made of, e.g., a transparent insulating material such as acrylic resin. The light guide lens 151 has a width of, e.g., 10-100 mm and a thickness of, e.g., 10-30 mm. The light guide lens 151 is, at the first flat surface 151a, bonded to the surface of the display panel 110 with an adhesive 159 such as ultraviolet curable resin, thermoset resin, or two-pack curable resin.

Figure 6:
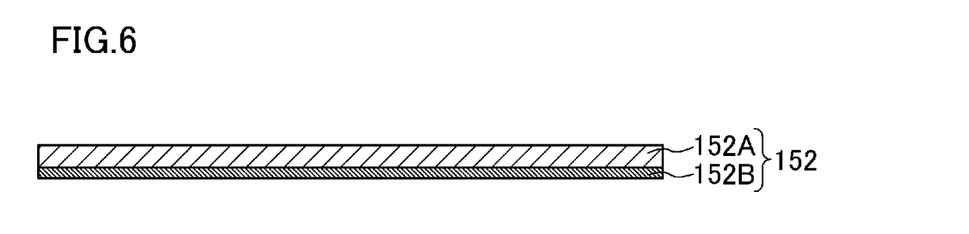
FIG. 6 is a cross-sectional view of an adhesive film of the first embodiment.

The adhesive film 152 is configured such that a base layer 152A and an adhesive layer 152B are stacked on each other, and is provided such that the adhesive layer 152B contacts part (i.e., the curved surface 151b and the second flat surface 151c) of the light guide lens 151 on the image display side.

The base layer 152A is formed of, e.g., a polyethylene terephthalate (PET) film or a triacetyl cellulose (TAC) film. The base layer 152A has a thickness of, e.g., 0.01-0.5 mm.

The adhesive layer 152B is formed of an optical double-sided tape. The adhesive layer 152B has a thickness of, e.g., 0.05-1 mm which is greater than the surface roughness of the concave-convex curved surface 151b of the light guide lens 151. Due to the thickness of the adhesive layer 152B greater than the surface roughness of the concave-convex curved surface 151b of the light guide lens 151, the adhesive layer 152B is provided on the curved surface 151b so that part of the adhesive layer 152B can be deformed in accordance with recessed parts of the concave-convex curved surface 151b and that the recessed parts can be filled with the adhesive layer 152B. Even if the adhesive layer 152B is deformed in accordance with the recessed parts of the curved surface 151b, an influence of such deformation does not reach the base layer 152A. Thus, a surface 152a of the adhesive film 152 is a non-concave-convex surface.

In a region of the display panel 110 where no light guide member 150 is provided, light for image display on the display panel 110 is, on average, output perpendicular to the display panel 110 as indicated by an arrow A illustrated in FIG. 4. On the other hand, since the frame-shaped light guide member 150 is provided at the peripheral edge part of the display panel 110 on the image display side, light is, as indicated by an arrow B illustrated in FIG. 4, refracted at the curved surface of the light guide member 150 in the peripheral edge part of the display panel 110 when passing through the light guide member 150, and then the light travels toward the outside of the display panel 110. Thus, in the case where the plurality of display apparatuses 100 are used to form the multi-display system 10 including the large-screen display 300, and each enlarged portion of an image is displayed on a corresponding one of the display apparatuses 100, part of light for image display outputs from the display panel 110 through the peripheral edge part thereof, and then is guided to the outside of the display panel 110. Thus, images can be easily viewed at a seam between adjacent ones of the display apparatuses 100, and therefore the seam becomes less noticeable.

(Method for Manufacturing Display Apparatus)

Next, a method for manufacturing the display apparatus 100 having the foregoing configuration will be described. The method includes first, second, and third steps.

First Step (Assembling of Display Panel and Housing)

First, a display panel 110, a backlight unit 120, and a housing 130 are prepared in a conventionally-known method. Then, the backlight unit 120 is fixed to an inner surface of the housing 130 opposite to a window 130W. Next, a frame-shaped spacer 131 is arranged at a peripheral edge part of the display panel 110 on a surface thereof on an image display side, or is arranged on an inner surface of a window frame 130F of the housing 130. Subsequently, the display panel 110 and the housing 130 are positioned such that a displayed image can be viewed from the outside through the window 130W, and then are fixed together. As a result, the display panel 110 and the backlight unit 120 are accommodated in the housing 130.

Second Step (Manufacturing of Light Guide Member)

A second step of manufacturing a light guide member 150 is performed independently of the first step. The second step includes a light guide lens formation step and a cover layer formation step.

Light Guide Lens Formation Step

First, acrylic resin is grinded by a machine, thereby forming a light guide lens. The light guide lens formed by machine grinding is in an elongated shape with a width of about 10-100 mm, a height of about 10-30 mm, and a length of about 500-1500 mm A surface of the light guide lens close to the display panel 110 and a surface of the light guide lens close to an outer peripheral end of a display apparatus 100 are formed respectively into flat surfaces 151*a*, 151*c*. The flat surfaces 151*a*, 151*c* are connected together through a curved surface 151*b* protruding toward the image display side. The light guide lens is in a plano-convex lens shape.

The curved surface of the light guide lens 151 formed at this point is polished. For example, polishing using sandpaper may be employed as a polishing method. First, the curved surface of the light guide lens 151 is polished with sandpaper having a low grit number of about #80. Then, the curved surface of the light guide lens 151 is further polished with sheets of sandpaper in the order from grit numbers of #120, #160, and #240. Finally, the curved surface of the light guide lens 151 is still further polished with sandpaper having a high grid number of about #400. Since the 400-grit sandpaper sheet has a polishing surface on which polishing grains each having a diameter of about 50 μm are provided, polishing can be performed such that the surface roughness of the concave-convex curved surface 151*b* reaches about 50 μm. Note that polishing may be performed such that the surface roughness of the concave-convex curved surface 151*b* reaches 40-250 μm. In a sequence of polishing step using the sandpaper, if a 500-grit sandpaper sheet is used as the smoothest sandpaper, the surface roughness of the concave-convex curved surface 151*b* is about 40 μm. Moreover, if a 100-grit sandpaper sheet is used as the smoothest sandpaper, the surface roughness of the concave-convex curved surface 151*b* is about 250 μm.

The light guide lens 151 may be formed of acrylic resin by molding, in addition to the case where the light guide lens 151 is formed by machine grinding.

Cover Layer Formation Step

Next, an adhesive film 152 is bonded to the curved surface 151*b* of the light guide lens 151 formed into the concave-convex surface having surface roughness of 40-250 μm and to the second flat surface 151*c* of the light guide lens 151. The adhesive film 152 is, at an adhesive layer 152B thereof, bonded so as to be stacked on the curved surface 151*b* and the second flat surface 151*c*, and is pressurized toward the light guide lens 151. Thus, the adhesive layer 152B of the adhesive film 152 is deformed such that recessed parts of the concave-convex curved surface 151*b* are filled with the adhesive layer 152B, and a surface 152*a* of the adhesive film 152 is formed into a non-concave-convex surface. Although the configuration in which the adhesive film 152 is bonded to the curved surface 151*b* and the second flat surface 151*c* has been described, the adhesive film 152 may be bonded so as to cover at least the curved surface 151*b*.

As in the foregoing manner, a light guide member 150 is manufactured.

Third Step (Bonding of Light Guide Member)

After the first and second steps, the light guide member 150 is bonded to a surface of an outer peripheral edge part of the display panel 110 and a surface of the window frame 130F. Specifically, e.g., ultraviolet curable resin, thermoset resin, and/or two-pack curable resin are, as an adhesive, applied onto the first flat surface 151*a* of the light guide lens 151 of the light guide member 150, and the light guide member 150 is arranged on a predetermined region extending across the display panel 110 and the window frame 130F. Then, if the ultraviolet curable resin and/or the thermoset resin is/are used as the adhesive, the adhesive is cured by ultraviolet irradiation and/or heating to bond the light guide member 150 to the surface of the outer peripheral edge part of the display panel 110 and the surface of the window frame 130F. Alternatively, if the two-pack curable resin is used as the adhesive, the adhesive is cured by air drying to bond the light guide member 150 to the surface of the outer peripheral edge part of the display panel 110 and the surface of the window frame 130F.

Note that, after an adhesive 159 is applied to the predetermined region extending across the display panel 110 and the window frame 130F, the light guide member 150 may be arranged thereon. A display apparatus 100 is manufactured in the foregoing manner.

Advantages of First Embodiment

According to the first embodiment, since it is only necessary to form, in the manufacturing process, the curved surface 151*b* of the light guide lens 151 into the concave-convex surface having surface roughness of 40-250 μm, polishing is not necessarily performed until the surface roughness reaches 40 μm or less, and therefore the polishing step can be simplified. Moreover, since the adhesive film 152 is, at the cover layer formation step, provided so as to cover the concave-convex curved surface 151*b* of the light guide lens 151 having surface roughness of 40-250 μm, the surface 152*a* of the light guide member 150 on the image display side can be formed into the non-concave-convex surface.

Variations of First Embodiment

Figure 7:
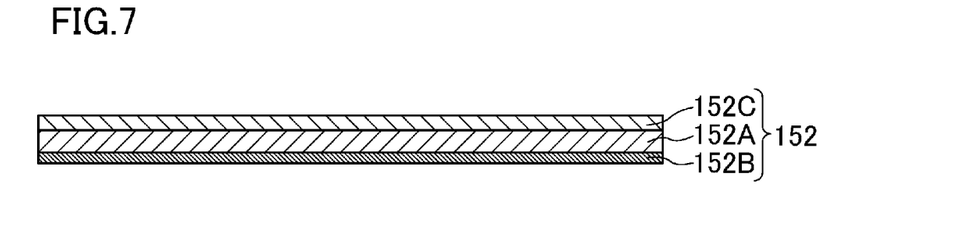
FIG. 7 is a cross-sectional view of an adhesive film of a first variation.

In the first embodiment, it has been described that the adhesive film 152 is configured such that the base layer 152A and the adhesive layer 152B are stacked on each other. However, as in a first variation illustrated in FIG. 7, an anti-reflection film 152C may be further provided on a surface of the base layer 152A opposite to the adhesive layer 152B. This reduces or prevents unexpected appearance of external light on the surface of the light guide member 150, resulting in better visibility. For example, an anti-reflection (AR) film configured to reduce or prevent reflection at a surface, an anti-glare (AG) film having a glare-proof function, or a non-reflective film (moth-eye film) having a moth-eye structure may be preferably used as the anti-reflection film 152C. Specifically, examples of the anti-reflection film 152C include "ReaLook (registered trademark)" manufactured by NOF Corporation and "CLEARAS AR F-series (registered trademark)" manufactured by Sumitomo Osaka Cement Co., Ltd.

Figure 8:
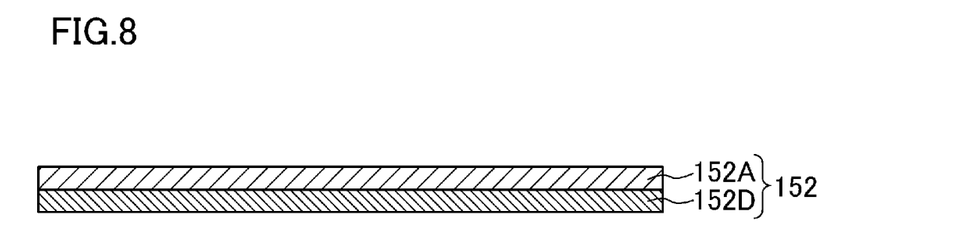
FIG. 8 is a cross-sectional view of an adhesive film of a second variation.

In the first embodiment, it has been described that the optical double-sided tape is used as the adhesive layer 152B of the adhesive film 152. However, as in a second variation illustrated in FIG. 8, a gel sheet may be used as the adhesive layer 152B. Even if the gel sheet is used as the adhesive layer 152B, the adhesive layer 152B is bonded such that the recessed parts of the concave-convex curved surface 151b of the light guide lens 151 are filled with the adhesive layer 152B, and therefore light guided by the light guide member 150 can be output through the non-concave-convex surface. In view of a refractive index identical to that of the light guide lens 151, an acrylic gel sheet is preferable as the gel sheet. Examples of the acrylic gel sheet include "300Z" series manufactured by Kyodo Giken Chemical Co., Ltd.

When the method for manufacturing the display apparatus 100 according to the first embodiment has been explained, it has been described that the third step, i.e., the step of bonding the light guide member 150 to the surfaces of the display panel 110 and the window frame 130F, is performed after the second step of forming the light guide member 150. However, after the light guide lens 151 is formed at the light guide lens formation step of the second step, the light guide lens 151 may be bonded to the surfaces of the display panel 110 and the window frame 130F, and then the adhesive film 152 may be formed so as to cover the curved surface 151b and the second flat surface 151c of the light guide lens 151. In such a case, the third step is completed at the same time as the cover layer formation step is completed.

In the first embodiment, it has been described that the frame-shaped light guide member 150 is provided so as to cover the surface of the outer peripheral edge part of the display panel. However, the light guide member 150 may be provided in a region of the outer peripheral edge part of the display panel 110 of one of the display apparatuses 100 which is adjacent to another one of the display apparatuses 100 when the display apparatuses 100 are combined together to form the large-screen display 300.

Second Embodiment (Display Apparatus)

Next, a display apparatus 100 of a second embodiment of the present disclosure will be described. As in the first embodiment, a plurality of display apparatuses 100 are combined together to form a multi-display system 10.

The display apparatus 100 includes a display panel 110 configured to display an image, a backlight unit 120 configured to output light to the display panel 110, a housing 130 containing the display panel 110 and the backlight unit 120, and a light guide member 150 provided corresponding to a peripheral edge part of the display panel 110.

Figure 9:
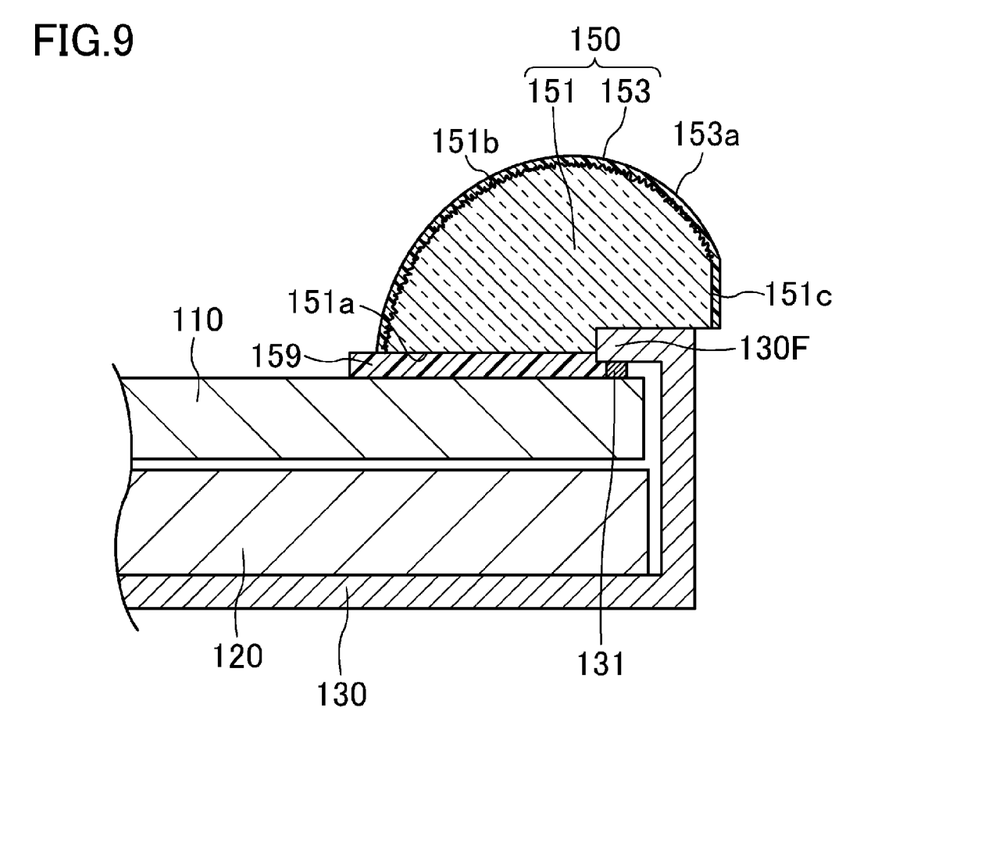
FIG. 9 is an enlarged cross-sectional view of a main part of a display apparatus of a second embodiment.

Referring to FIG. 9, the frame-shaped light guide member 150 is provided at the peripheral edge part of the display panel 110 on a surface thereof on an image display side. The light guide member 150 includes a light guide lens 151 and a coating layer 153 which is a cover layer provided so as to cover a surface of the light guide lens 151 on the image display side.

The light guide lens 151 includes a first flat surface 151a facing the display panel 110, a curved surface 151b protruding toward the image display side, and a second flat surface 151c forming an outer surface of the light guide member 150. The light guide lens 151 is in a plano-convex lens shape. The curved surface 151b of the light guide lens 151 is a concave-convex surface having surface roughness of 40-250 μm. The light guide lens 151 is made of, e.g., a transparent insulating material such as acrylic resin. The light guide lens 151 has a width of, e.g., 10-100 mm and a thickness of, e.g., 10-30 mm. The light guide lens 151 is, at the first flat surface 151a, bonded to the surface of the display panel 110 with an adhesive 159 such as ultraviolet curable resin, thermoset resin, or two-pack curable resin.

The coating layer 153 is made of ultraviolet curable resin, thermoset resin, or two-pack curable resin. The coating layer 153 is provided so as to coat the surface of the light guide lens 151. Thus, recessed parts of the concave-convex curved surface 151b of the light guide lens 151 are filled with the resin, and a surface 153a of the coating layer 153 on the image display side is formed into a non-concave-convex surface. Since the coating layer 153 is formed such that the recessed parts of the concave-convex surface are filled with the coating layer 153 and that the surface 153a is formed into the non-concave-convex surface, the thickness of the coating layer 153 is preferably greater than the surface roughness of the concave-convex surface. Moreover, since an extremely-large thickness of the coating layer 153 results in lowering of a transmittance, the thickness of the coating layer 153 is preferably prevented from being extremely large. For example, if the surface roughness of the concave-convex surface is 50 μm, the thickness of the coating layer 153 is preferably greater than about 50 μm and equal to or less than about 80 μm.

Configurations of the second embodiment other than the light guide member 150 are the same as those of the first embodiment.

(Method for Manufacturing Display Apparatus)

Next, a method for manufacturing the display apparatus 100 having the foregoing configuration will be described. The method includes first, second, and third steps.

First Step (Assembling of Display Panel and Housing)

First, a display panel 110 and a backlight unit 120 are arranged inside a housing 130 as in the first embodiment.

Second Step (Manufacturing of Light Guide Member)

A second step of manufacturing a light guide member 150 is performed independently of the first step. The second step includes a light guide lens formation step and a cover layer formation step.

Light Guide Lens Formation Step

As in the first embodiment, acrylic resin is first grinded by a machine, thereby forming a light guide lens in a plano-convex lens shape. Then, a curved surface 151b is, with sandpaper, polished into a concave-convex surface having surface roughness of 40-250 nm.

Cover Layer Formation Step

Next, brush coating or dipping is performed for the curved surface 151b of the light guide lens 151 formed into the concave-convex surface having surface roughness of 40-250 nm and for a second flat surface 151c of the light guide lens 151. As a result, a film of, e.g., ultraviolet curable resin, thermoset resin, and/or two-pack curable resin is formed. At this point, recessed parts of the concave-convex curved surface 151b of the light guide lens 151 are filled with the resin. Then, if the ultraviolet curable resin and/or the thermoset resin is/are used as an adhesive, the resin(s) is cured by ultraviolet irradiation and/or heating to form a coating layer 153. Alternatively, if the two-pack curable resin is used as the adhesive, the resin is cured by air drying to form the coating layer 153.

Third Step (Bonding of Light Guide Member)

As in the first embodiment, the light guide member 150 is, after the first and second steps, bonded to a surface of an outer peripheral edge part of the display panel 110 and a surface of a window frame 130F. In the foregoing manner, a display apparatus 100 is manufactured.

Advantages of Second Embodiment

According to the second embodiment, since it is only necessary to form, in the manufacturing process, the curved surface 151b of the light guide lens 151 into the concave-convex surface having surface roughness of 40-250 µm, polishing is not necessarily performed until the surface roughness reaches 40 µm or less, and therefore a polishing step can be simplified. Moreover, since the coating layer 153 is, at the cover layer formation step, provided so as to cover the concave-convex curved surface 151b of the light guide lens 151 having surface roughness of 40-250 µm, the surface 153a of the light guide member 150 on the image display side can be formed into the non-concave-convex surface.

Variation of Second Embodiment

In the second embodiment, it has been described that the coating layer 153 is made of ultraviolet curable resin, thermoset resin, or two-pack curable resin. However, the coating layer 153 may be made of clear coat resin. Examples of the clear coat resin include commercially-available acrylic-based resin used for clear coating of a painted surface of an automobile. In such a case, clear coat resin is sprayed onto the surface of the light guide lens 151 and then is cured by air drying, thereby forming the coating layer 153.

Third Embodiment (Display Apparatus)

Next, a display apparatus 100 of a third embodiment of the present disclosure will be described. As in the first embodiment, a plurality of display apparatuses 100 are combined together to form a multi-display system 10.

The display apparatus 100 includes a display panel 110 configured to display an image, a backlight unit 120 configured to output light to the display panel 110, a housing 130 containing the display panel 110 and the backlight unit 120, a light guide member 150 provided corresponding to a peripheral edge part of the display panel 110, and a front cover part 154 covering a surface of the display panel 110 on an image display side.

Figure 10:
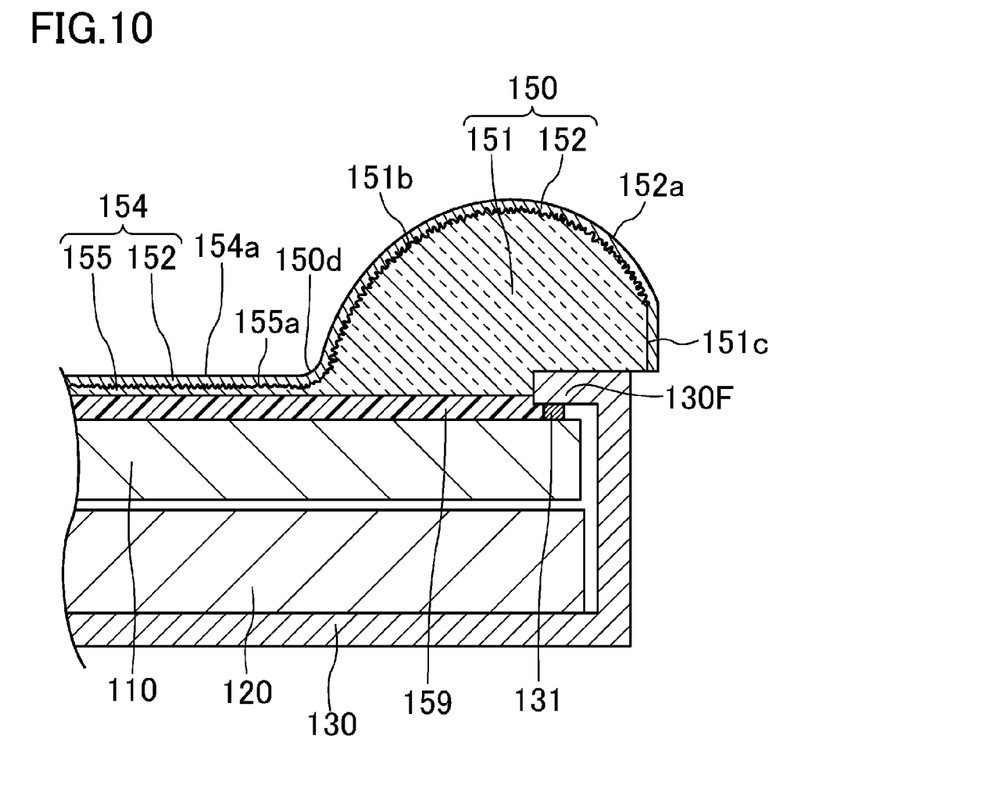
FIG. 10 is an enlarged cross-sectional view of a main part of a display apparatus of a third embodiment.

The front cover part 154 is integrally formed with the light guide member 150. Specifically, the front cover part 154 includes a front cover part body 155 integrally formed with a light guide lens 151, and an adhesive film 152 provided so as to cover a surface of the front cover part body 155 on the image display side. The adhesive film 152 extends from the light guide member 150 to the front cover part 154. The light guide member 150 and the front cover part 154 are connected together so as to define a smooth curve at a joint between the light guide member 150 and the front cover part 154 as viewed in a cross section. In other words, a curved surface 151b of the light guide member 150 protruding toward the image display side and a surface 154a of the front cover part 154 on the image display side are connected together through a smooth curved surface 150d. The front cover part 154 has a thickness of, e.g., 0.5-5 mm.

Other configurations of the display apparatus 100 of the present embodiment other than the light guide member 150 and the front cover part 154 are the same as those of the first embodiment.

(Method for Manufacturing Display Apparatus)

Next, a method for manufacturing the display apparatus 100 having the foregoing configuration will be described. The method includes first, second, and third steps.

First Step (Assembling of Display Panel and Housing)

First, a display panel 110 and a backlight unit 120 are arranged inside a housing 130 as in the first embodiment.

Second Step (Manufacturing of Light Guide Member)

A second step of manufacturing a light guide member 150 is performed independently of the first step. The second step includes a light guide lens formation step and a cover layer formation step.

Light Guide Lens Formation Step

First, acrylic resin is grinded by a machine, and is molded such that a light guide lens 151 in a plano-convex lens shape and a front cover part body 155 are integrally formed. Then, a curved surface 151b of the light guide lens 151 and a surface 155a of the front cover part body 155 are, with sandpaper, polished into a concave-convex surface having surface roughness of 40-250 µm.

Cover Layer Formation Step

Next, an adhesive film 152 is bonded to the curved surface 151b of the light guide lens 151 formed into the concave-convex surface having surface roughness of 40-250 µm, a second flat surface 151c of the light guide lens 151, and the surface 155a of the front cover part body 155. The adhesive film 152 is bonded such that an adhesive layer 152B is stacked on the curved surface 151b and the second flat surface 151c of the light guide lens 151 and the surface 155a of the front cover part body 155. The adhesive film 152 is pressurized toward the light guide lens 151 and the front cover part body 155. Thus, the adhesive layer 152B of the adhesive film 152 is deformed such that recessed parts of the concave-convex curved surface 151b and the concave-convex surface 155a are filled with the adhesive layer 152B, and a surface 152a of the adhesive film 152 is formed into a non-concave-convex surface. Although the configuration in which the adhesive film 152 is bonded to the curved surface 151b, the second flat surface 151c, and the surface 155a has been described, the adhesive film 152 may be bonded so as to cover at least the curved surface 151b and the surface 155a.

As in the foregoing manner, a light guide member 150 is manufactured.

Third Step (Bonding of Light Guide Member)

As in the first embodiment, the light guide member 150 and the front cover part 154 are, after the first and second steps, bonded to a surface of the display panel 110 and a surface of a window frame 130F. In the foregoing manner, a display apparatus 100 is manufactured.

Advantages of Third Embodiment

According to the third embodiment, since it is only necessary to form, in the manufacturing process, the curved surface 151b of the light guide lens 151 into the concave-convex surface having surface roughness of 40-250 μm, polishing is not necessarily performed until the surface roughness reaches 40 μm or less, and therefore a polishing step can be simplified. Moreover, since the adhesive film 152 is, at the cover layer formation step, provided so as to cover the concave-convex curved surface 151b of the light guide lens 151 having surface roughness of 40-250 μm and the surface 155a of the front cover part body 155, the surfaces 152a of the light guide member 150 and the front cover part 154 on the image display side can be formed into the non-concave-convex surface.

According to the display apparatus 100 of the present embodiment, the display apparatus 100 includes the front cover part 154 integrally formed with the light guide member 150, and the curved surface of the light guide member 150 protruding toward the image display side and the surface 154a of the front cover part 154 on the image display side are connected together through the smooth curved surface 150d. Thus, there is no boundary between light output through the curved surface after passing through the light guide member 150 and light output through part of the surface 152a of the adhesive film 152 inside the light guide member 150. Consequently, an image more natural to a viewer is displayed.

According to the display apparatus 100 of the present embodiment, the surface of the display panel 110 is covered by the front cover part 154, the physical strength of the display panel 110 is increased.

Variations of Third Embodiment

In the third embodiment, it has been described that the front cover part 154 is integrally formed with the light guide member 150. However, the front cover part 154 may include only the front cover part body 155 made of acrylic resin. In such a case, the front cover part body 155 is integrally formed with the light guide lens 151 of the light guide member 150. In the manufacturing process, the curved surface 151b of the light guide lens 151 and the surface 155a of the front cover part body 155 are, with the sandpaper, polished into the concave-convex surface having surface roughness of 40-250 μm at the light guide lens formation step of the second step.

In the third embodiment, it has been described that the adhesive film 152 is provided on the surfaces of the light guide lens 151 and the front cover part body 155 on the image display side. However, as in the second embodiment, the coating layer 153 may be provided on the surfaces of the light guide lens 151 and the front cover part body 155 on the image display side so that the surfaces of the light guide member 150 and the front cover part 154 can be formed into the non-concave-convex surfaces.

Other Embodiments

In the first and second embodiments, the curved surface 151b of the light guide lens is, with the sandpaper, polished into the concave-convex surface having surface roughness of 40-250 μm at the light guide lens formation step. However, if the curved surface 151b can be formed into the concave-convex surface having surface roughness of 40-250 μm at the step of grinding acrylic resin by the machine, polishing can be skipped.

In the foregoing embodiments and variations, the liquid crystal display apparatus has been described as the display apparatus 100. However, the present disclosure is not limited to the liquid crystal display apparatus. For example, the display apparatus 100 may be an organic EL display apparatus, an inorganic EL display apparatus, an electrophoretic display apparatus, a plasma display (PD), a plasma addressed liquid crystal (PALC) display, a field emission display (FED), or a surface-conduction electron-emitter display (SED). Moreover, a drive system of the display panel 110 of the display apparatus 100 may be a field sequential color system.

INDUSTRIAL APPLICABILITY

The present disclosure is useful for the display apparatus, the multi-display system using the display apparatus and configured to display a seamless image, and the method for manufacturing the display apparatus.

DESCRIPTION OF REFERENCE CHARACTERS

10 Multi-Display System
100 Display Apparatus
110 Display Panel
130 Housing
130F Window Frame
130W Window
150 Light Guide Member
151 Light Guide Lens
151a Flat Surface
151b Curved Surface (Concave-Convex Surface)
152 Adhesive Film (Cover Layer)
152A Base Layer
152B Adhesive Layer
152C Anti-Reflection Film
152D Adhesive Layer
152a Surface on Image Display Side (Non-Concave-Convex Surface)
153 Coating Layer (Cover Layer)
153a Surface on Image Display Side (Non-Concave-Convex Surface)

The invention claimed is:

1. A display apparatus comprising:
a display panel;
a housing containing the display panel and including an image-display-side part as a window frame corresponding to a peripheral edge part of the display panel, a displayed image on the display panel being viewed from an outside through a window surrounded by the window frame; and
a light guide member
which is provided so as to cover a surface of an outer peripheral edge part of the display panel and a surface of the window frame, and to guide light for image display to an outside of the display panel, and
which includes
a light guide lens having a flat surface facing the display panel and a concave-convex curved surface protruding toward an image display side and having surface roughness of 40-250 μm, and
a cover layer covering the curved surface of the light guide lens and having a non-concave-convex surface on the image display side.

2. The display apparatus of claim 1, wherein
the cover layer is an adhesive film in which an adhesive layer provided close to the light guide lens and having a thickness greater than the surface roughness of the concave-convex curved surface and a base layer are stacked on each other.

3. The display apparatus of claim 2, wherein
the adhesive film further includes an anti-reflection film on a surface of the base layer opposite to the adhesive layer.

4. The display apparatus of claim 2, wherein
the adhesive layer is an optical transparent double-sided tape or a gel sheet.

5. The display apparatus of claim 1, wherein
the cover layer is a coating layer coating the concave-convex curved surface to form the non-concave-convex surface thereon and made of ultraviolet curable resin, thermoset resin, two-pack curable resin, or clear coat resin.

6. The display apparatus of claim 1, wherein
a surface of the display panel on the image display side is covered by a front cover part integrally formed with the light guide member, and
a surface of the light guide member on the image display side and a surface of the front cover part on the image display side are connected together through a smooth curved surface.

7. A multi-display system configured to display an image on a large screen formed by combining a plurality of display apparatuses of claim 1.

8. A method for manufacturing a display apparatus, comprising:
a first step of arranging a display panel inside a housing such that a displayed image on the display panel is viewed from an outside through a window surrounded by a window frame of the housing corresponding to a peripheral edge part of the display panel;
a second step including
a light guide lens formation step of forming a light guide lens having
a flat surface facing the display panel, and
a concave-convex curved surface protruding toward an image display side and having surface roughness of 40-250 μm, and
a cover layer formation step of forming a light guide member in such a manner that the curved surface of the light guide lens is covered by a cover layer to form an image-display-side surface of the cover layer into a non-concave-convex surface; and
a third step of bonding, to a surface of an outer peripheral edge part of the display panel and a surface of the window frame, the light guide member configured to guide light for image display to an outside of the display panel,
wherein, after the first and second steps are performed independently of each other, the third step is performed or
after the light guide lens formed at the light guide lens formation step is bonded to the surface of the outer peripheral edge part of the display panel and the surface of the window frame, the cover layer formation step is completed to complete the third step.

9. The method of claim 8, wherein
at the light guide lens formation step, the concave-convex curved surface of the light guide lens is polished with an abrasive.

10. The method of claim 8 or 9, wherein
at the cover layer formation step, an adhesive film in which an adhesive layer having a thickness greater than the surface roughness of the concave-convex curved surface and a base layer are stacked on each other is, as the cover layer, bonded to the light guide lens such that the adhesive layer contacts the light guide lens.

11. The method of claim 10, wherein
the adhesive film further includes an anti-reflection film on a surface of the base layer opposite to the adhesive layer.

12. The method of claim 10, wherein
the adhesive layer is an optical transparent double-sided tape or a gel sheet.

13. The method of claim 8, wherein
at the cover layer formation step, a coating layer is, as the cover layer, formed in such a manner that the concave-convex curved surface is coated by ultraviolet curable resin, thermoset resin, two-pack curable resin, or clear coat resin to form the concave-convex curved surface into the non-concave-convex surface.

* * * * *